Dec. 31, 1963  F. F. WILCOX  3,115,671
METHOD AND PROCESS OF CONDITIONING AND PROCESSING
ANIMALS IN MEAT PACKING PLANTS
Filed March 26, 1962
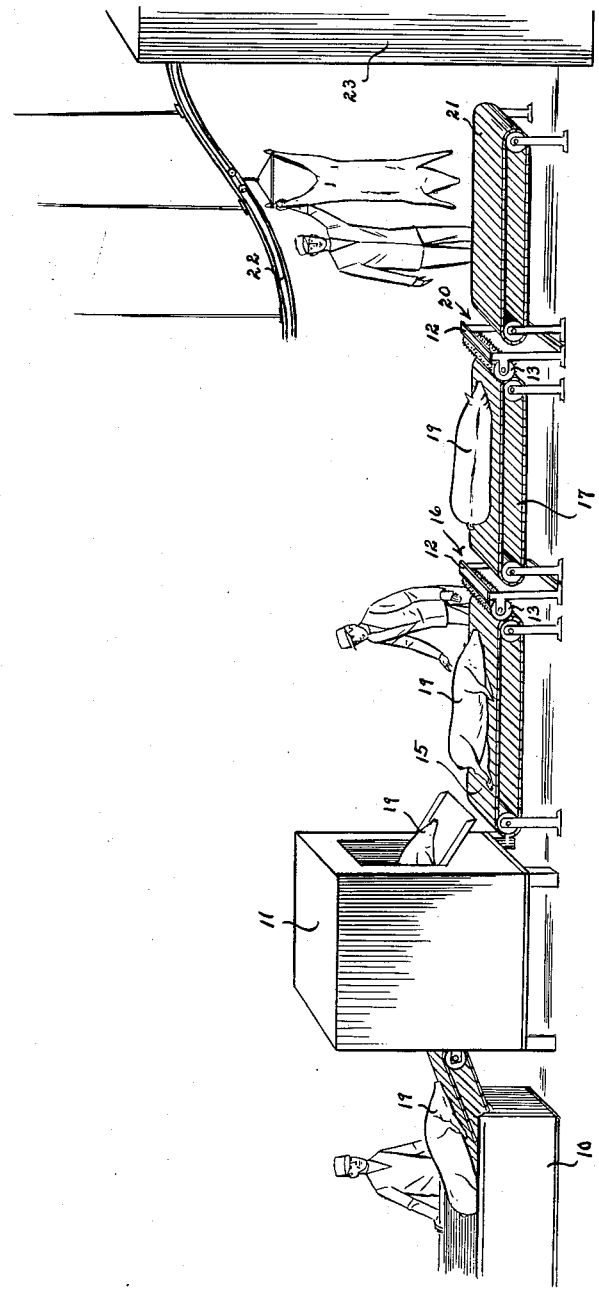
INVENTOR.
FREDERICK F. WILCOX
BY
Talbert Dick & Earley
ATTORNEYS
WITNESS
NORMAN G. TRAVISS

United States Patent Office 3,115,671
Patented Dec. 31, 1963

3,115,671
METHOD AND PROCESS OF CONDITIONING AND PROCESSING ANIMALS IN MEAT PACKING PLANTS
Frederick F. Wilcox, 1506 Beaver Ave., Des Moines, Iowa
Filed Mar. 26, 1962, Ser. No. 182,558
6 Claims. (Cl. 17—45)

This invention relates to the method of processing animals such as hogs for eating purposes and more particularly to an animal processing procedure for animal slaughtering and packing plants.

In all modern animal slaughter and packing plants, the procedure is a line production one. In the matter of hogs, the first step after the animal has been killed is to pass the carcass through a hot water compartment. After the animal passes from the compartment on an endless belt conveyor, it is subjected to a machine for removing the bristles and hair. From the bristle removing step, the animal is moved on a belt conveyor where workmen remove all remaining bristles and hair not previously removed by the machine. Also at this station in the line production, the workmen clean the carcass. At this period in the processing the animal is referred to as a "hot hog" inasmuch as its body temperature is still high. The next step is to elevate the carcass by its hind legs onto an elevated track means. While in this position the carcass is opened and internal organs removed. The next step is to move the carcass into the chilling room where it will remain for several hours. After the carcass has become completely chilled, it is then cut into pieces and skinned. This step by step procedure is followed by all plants processing hogs of which I have knowledge. However, from experience I find that this usual common procedure embraces several objections. Firstly, the skin is difficult to remove after the carcass has been chilled. Secondly, the time period and cost of the chilling phase are excessive. Thirdly, a loss of valuable fat is realized. Fourthly, much time and labor are expended in the cleaning phase after the carcass passes from the debristling machine, and fifthly, the relatively great number of workmen necessary to process a given number of hogs. Therefore, one of the principal objects of my invention is to provide a more efficient method of processing hogs for food purposes.

A further object of this invention is to provide a method of processing slaughtered animals that greatly reduces the time and labor necessary in the skinning of the animals.

A still further object of this invention is to provide a method of processing slaughtered hogs that reduces the period of time and cost in the animal chilling phase.

A still further object of this invention is to provide a method of processing slaughtered hogs that substantially eliminates the costly "clean up" phase.

A still further object of my invention is to provide a method of processing animals for food purposes that produces a saving of valuable food.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a diagrammatical view of my method of processing slaughtered hogs.

As herebefore indicated, I use in my process substantially all and the same equipment now used in packing plants. However, my invention resides in changing the order in which a hog is processed. The first two steps in my process are the same as the first two steps herebefore used in the processing of a hog. The first step is the subjecting of the killed animal to a vat 10 of hot water. The second step is the passing of the carcass through a dehairing or debristling machine 11. The third step of my process is changed from the old order. This third step in my process is the immediate skinning of the hog after it leaves the machine 11. Any suitable skinning equipment may be used. The most common type is a rigid knife blade 12 and a motorized rotor 13 for moving the carcass toward the blade. I recommend that the hog (laying on one side) be carried from the machine 11 by an endless horizontal belt means 15, to and into the first skinning means 16. This skinning means 16 is between the forward end of the belt means 15 and the rear end of the endless horizontal belt means 17. Therefore, the hog will pass from the belt means 15 onto the belt means 17, and in so doing, will have its under side skinned. While the hog 19 is on the belt means 17, it is turned over, as shown in FIG. 1. The belt means 17 moves the hog into the second skinning means 20. This skinning means 20 is between the forward end of the belt means 17 and the rear end of the endless horizontal belt means 21. As the hog passes from the belt means 17, over the skinning means 20, and onto the belt means 21, the other and remaining side of the hog will be skinned. As many belt means and skinning means as desired may be used. Obviously all the endless belt means are power driven. With the skin removed the hog is hung head down from an elevated track 22 and the fourth step is the opening of the carcass and the removal of certain of the internal organs. The hog is then transported by means of the track means 22 into the chilling chamber 23, and which is the fifth step. After the "hot hog" has been thoroughly chilled in the chamber 23, the sixth step is completed, i.e., the cutting of the carcass into pieces.

From the foregoing it will be appreciated that I have moved the usual skinning phase of a cold carcass to an earlier step of skinning a hot hog directly after it has been dehaired. At first consideration it may seem that my step by step process is of minor moment. However, to the contrary, great and unexpected results are obtained. By skinning the hog while hot, the operation is greatly facilitated. One reason for this is that if the hog is chilled prior to skinning, the skin and fat thereunder congeals and fuses, making the skin removal difficult. With the skinning phase taking place while the hog is hot, there is a definite demarcation between the skin and the fat. This means that substantially all the valuable fat will remain with the carcass and not be torn off with the skin. Also in skinning a hot hog, the skin is pliable and therefore more easily, quickly and thoroughly removed. Also the skin is much less damaged and therefore more valuable for processing into leather. Perhaps one of the most important results of my method is that the usual costly "animal clean up" step is all but eliminated. By skinning the hog directly after it is removed from the partial dehairing machine 11, it is not necessary to remove hair or bristles missed by the machine 11. The skinning takes care of the herebefore clean up step, and the carcass is clean and ready for the next step. Still another important result takes place in the chilling room. With the skin already removed from the hog, no costly refrigeration is used in chilling the skin and like. Furthermore, with the skin removed the carcass will more quickly chill and with less refrigeration cost than herebefore. This means a saving in time, money and labor. Still another advantage of my method is that chilled meat, without the skin, is easier to cut up into pieces.

From the foregoing it will be appreciated that my method gives greater over all yield due to closer skinning of all cuts. My method will give greater over all usable skin yields. The cost of handling trimmings will be greatly reduced. My method is economical, a time saver, a labor saver, and a producer of better meat for human consumption.

Some changes may be made in the construction and arrangement of my method and process of conditioning and processing animals in meat packing plants without departing from the real spirit and purpose of my invention, and it is my intention to cover by my claims, any modified forms of structure or use of mechanical equivalents which may be reasonably included within their scope.

I claim:

1. The step by step of processing slaughtered hogs, comprising,
   (a) the subjecting of the carcass to hot temperature,
   (b) next the passing of the carcass through a dehairing machine,
   (c) next the skinning of the carcass, while it is still hot,
   (d) the chilling of the carcass after the skinning step,
   (e) and the cutting of the carcass into pieces.

2. The step by step of processing slaughtered hogs, comprising,
   (a) the subjecting of the carcass to hot water,
   (b) next the passing of the carcass through a dehairing machine,
   (c) next the skinning of the carcass, while it is still hot,
   (d) the chilling of the carcass after the skinning step,
   (e) and the cutting of the carcass into pieces.

3. The step by step of processing slaughtered hogs, comprising,
   (a) the subjecting of the carcass to hot temperature,
   (b) the skinning of the carcass, while it is hot,
   (c) and the chilling of the carcass after it has been skinned under warm conditions.

4. The step by step of processing slaughtered hogs, comprising,
   (a) the subjecting of the carcass to hot temperature,
   (b) next the passing of the carcass through a dehairing machine,
   (c) next the skinning of the carcass, while it is still hot,
   (d) the removal of internal organs from the carcass,
   (e) the chilling of the carcass after the skinning step,
   (f) and the cutting of the carcass into pieces.

5. The step by step of processing slaughtered hogs, comprising,
   (a) the subjecting of the carcass to hot temperature,
   (b) next the passing of the carcass through a dehairing machine,
   (c) next the skinning of the carcass, while it is still hot,
   (d) next the vertical hanging of the carcass and the removal of internal organs therefrom,
   (e) next the chilling of the skinned carcass,
   (f) and lastly, the cutting of the carcass into pieces after it has been chilled.

6. The step by step of processing slaughtered hogs, comprising,
   (a) the subjecting of the carcass to hot temperature,
   (b) next the skinning of the carcass, while it is still hot,
   (c) next the vertical hanging of the carcass and the removal of internal organs therefrom,
   (d) next the chilling of the skinned carcass,
   (e) and lastly, the cutting of the carcass into pieces after it has been chilled.

References Cited in the file of this patent
UNITED STATES PATENTS 2,715,749     Coughenour _____ Aug. 23, 1955